(12) United States Patent
Morikawa

(10) Patent No.: US 11,570,328 B2
(45) Date of Patent: Jan. 31, 2023

(54) LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

(71) Applicant: BROTHER KOGYO KABUSHIKI KAISHA, Nagoya (JP)

(72) Inventor: Shota Morikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 29 days.

(21) Appl. No.: 17/400,099

(22) Filed: Aug. 11, 2021

(65) Prior Publication Data
US 2022/0063289 A1  Mar. 3, 2022

(30) Foreign Application Priority Data

Aug. 31, 2020 (JP) .............................. JP2020-145604

(51) Int. Cl.
| | |
|---|---|
| H04N 1/17 | (2006.01) |
| G06K 15/02 | (2006.01) |
| B41J 2/21 | (2006.01) |
| H04N 1/19 | (2006.01) |
| H04N 1/028 | (2006.01) |
| H04N 1/029 | (2006.01) |
| G06K 15/10 | (2006.01) |

(52) U.S. Cl.
CPC .................. *H04N 1/17* (2013.01); *B41J 2/21* (2013.01); *G06K 15/105* (2013.01); *G06K 15/1802* (2013.01); *H04N 1/029* (2013.01); *H04N 1/0281* (2013.01); *H04N 1/19* (2013.01)

(58) Field of Classification Search
None
See application file for complete search history.

(56) References Cited

U.S. PATENT DOCUMENTS

| | | | | |
|---|---|---|---|---|
| 11,267,240 B2* | 3/2022 | Doi | ...................... | B41J 2/2052 |
| 2008/0240749 A1 | 10/2008 | Horade | | |
| 2009/0295856 A1 | 12/2009 | Yoshida | | |
| 2015/0158309 A1 | 6/2015 | Fujii et al. | | |
| 2017/0282590 A1* | 10/2017 | Ozawa | ................... | B41J 11/008 |
| 2021/0094275 A1* | 4/2021 | Takasaki | ............... | B41J 2/04586 |
| 2021/0402798 A1* | 12/2021 | Arakane | .............. | G06K 15/107 |
| 2022/0063275 A1* | 3/2022 | Arakane | ................ | B41J 2/1652 |

FOREIGN PATENT DOCUMENTS

| | | |
|---|---|---|
| JP | 2008-246883 A | 10/2008 |
| JP | 2013-039838 A | 2/2013 |
| JP | 2015-131483 A | 7/2015 |

* cited by examiner

*Primary Examiner* — Miya J Williams
(74) *Attorney, Agent, or Firm* — Kenealy Vaidya LLP

(57) ABSTRACT

A liquid discharging apparatus includes: a head having nozzles; and a controller. The controller executes: a first recording processing of discharging liquid from the nozzles with respect to a first area of a recording medium, based on first image data, and a second recording processing of discharging the liquid from the nozzles with respect to a second area, of the recording medium, which overlaps with or is adjacent to the first area based on second image data, after a predetermined time has elapsed since the first recording processing. The controller further executes a determining processing of determining the predetermined time based on color information of the first image data.

15 Claims, 18 Drawing Sheets

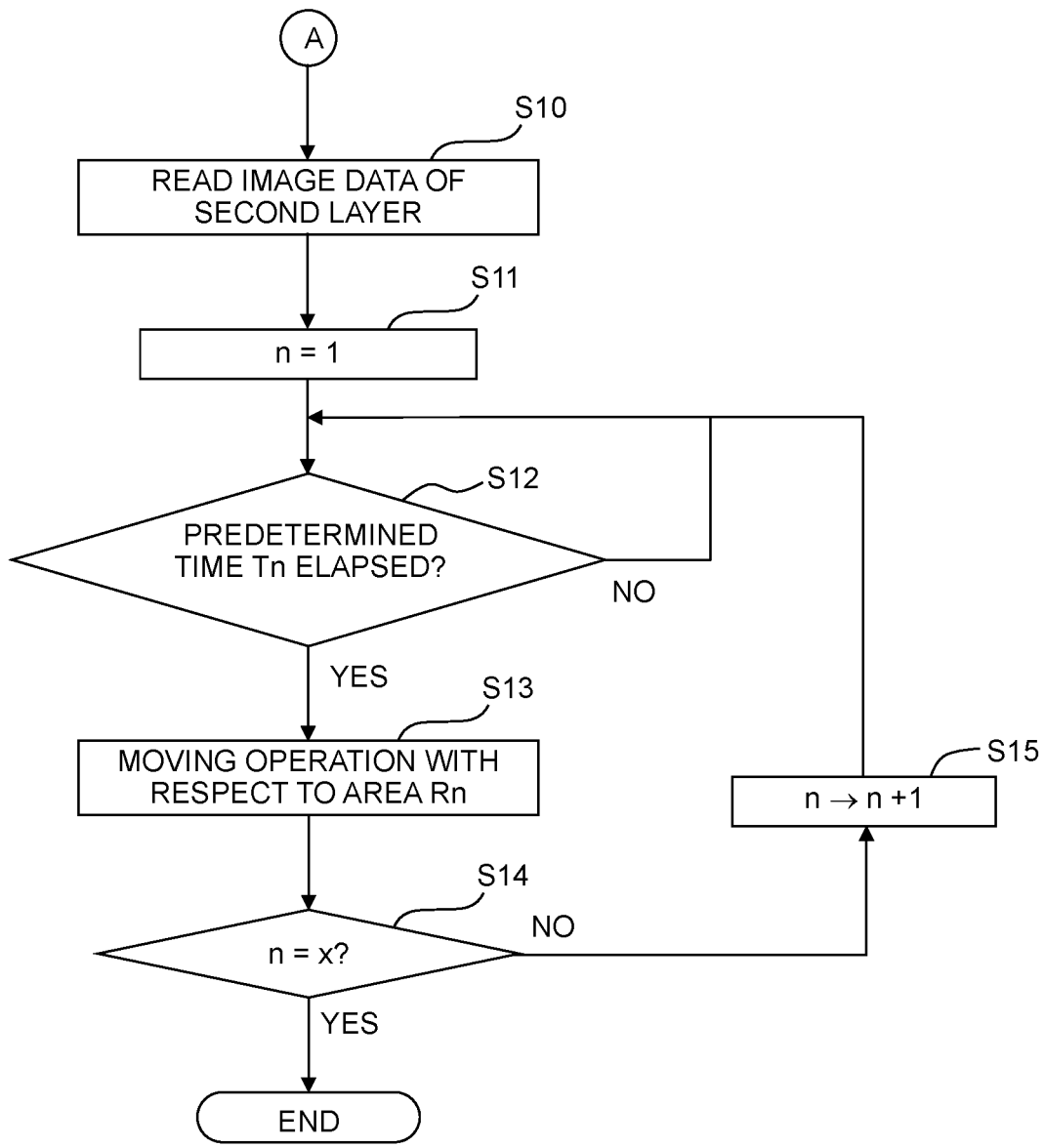

FIG. 7

| R | G | B | WEIGHT VALUE |
|---|---|---|---|
| 0 | 0 | 0 | 0 |
| 0 | 0 | 32 | 15 |
| 0 | 0 | 64 | 20 |
| - | - | - | - |
| 0 | 0 | 255 | 70 |
| - | - | - | - |
| 150 | 150 | 150 | 90 |
| 150 | 150 | 166 | 110 |
| 150 | 150 | 182 | 120 |
| - | - | - | - |
| 200 | 200 | 255 | 10 |
| 232 | 200 | 255 | 9 |
| - | - | - | - |
| 255 | 255 | 255 | 0 |

FIG. 9

| AREA Rn | STARTING POINT OF TIME t1 OF FIRST MOVING OPERATION | PREDETERMINED TIME Tn(s) | STARTABLE POINT OF TIME t2 OF SECOND MOVING OPERATION | NORMAL STARTING POINT OF TIME t2' OF SECOND MOVING OPERATION |
|---|---|---|---|---|
| R1 | 0' 00" | 20 | 0' 20" | 1' 30" |
| R2 | 0' 10" | 100 | 1' 50" | 1' 40" |
| R3 | 0' 20" | 10 | 0' 30" | 1' 50" |
| R4 | 0' 30" | 0 | 0' 30" | 2' 00" |
| R5 | 0' 40" | 10 | 0' 50" | 2' 10" |
| - | - | - | - | - |
| - | - | - | - | - |
| Rx | 1' 20" | - | - | - |

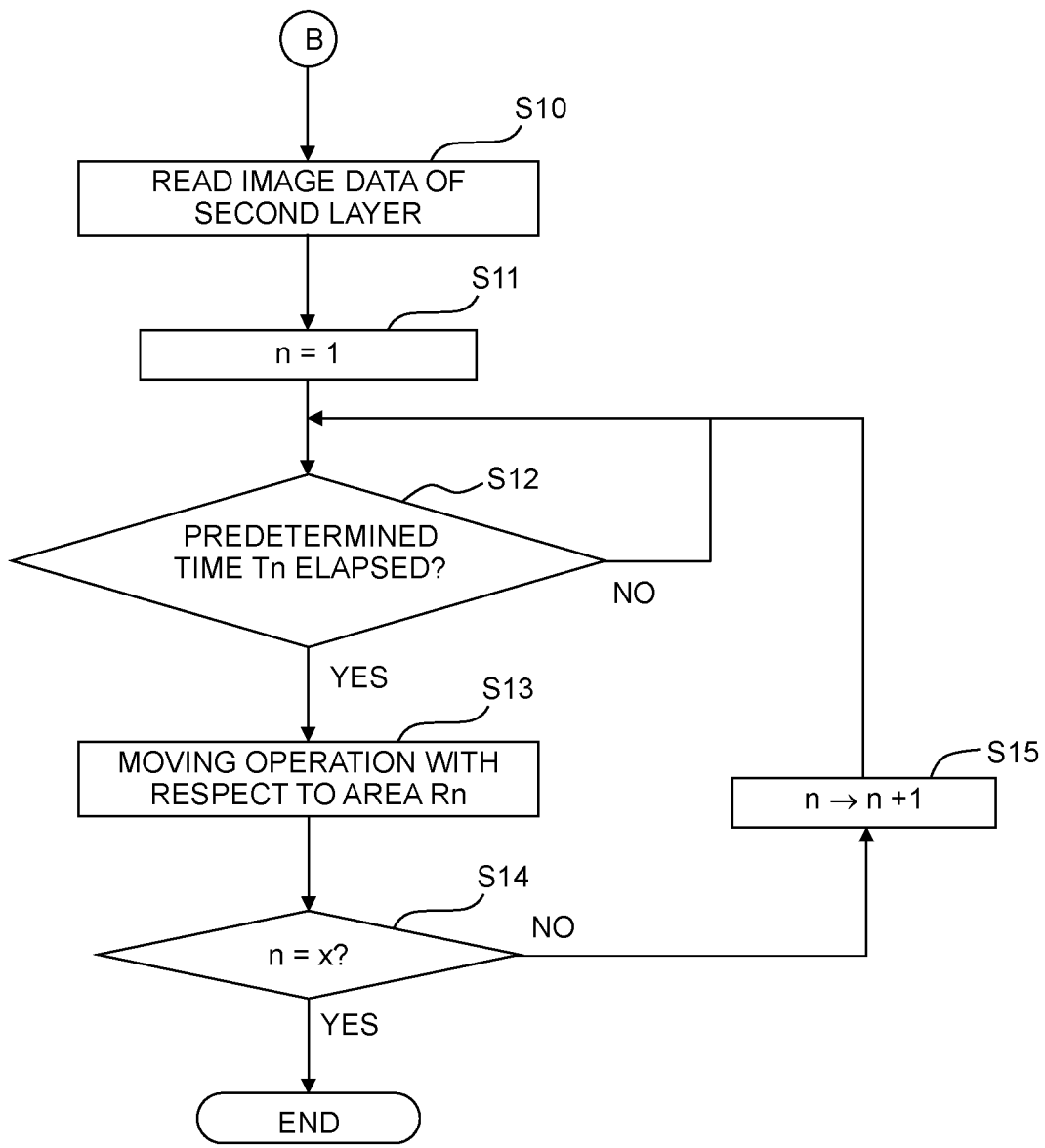

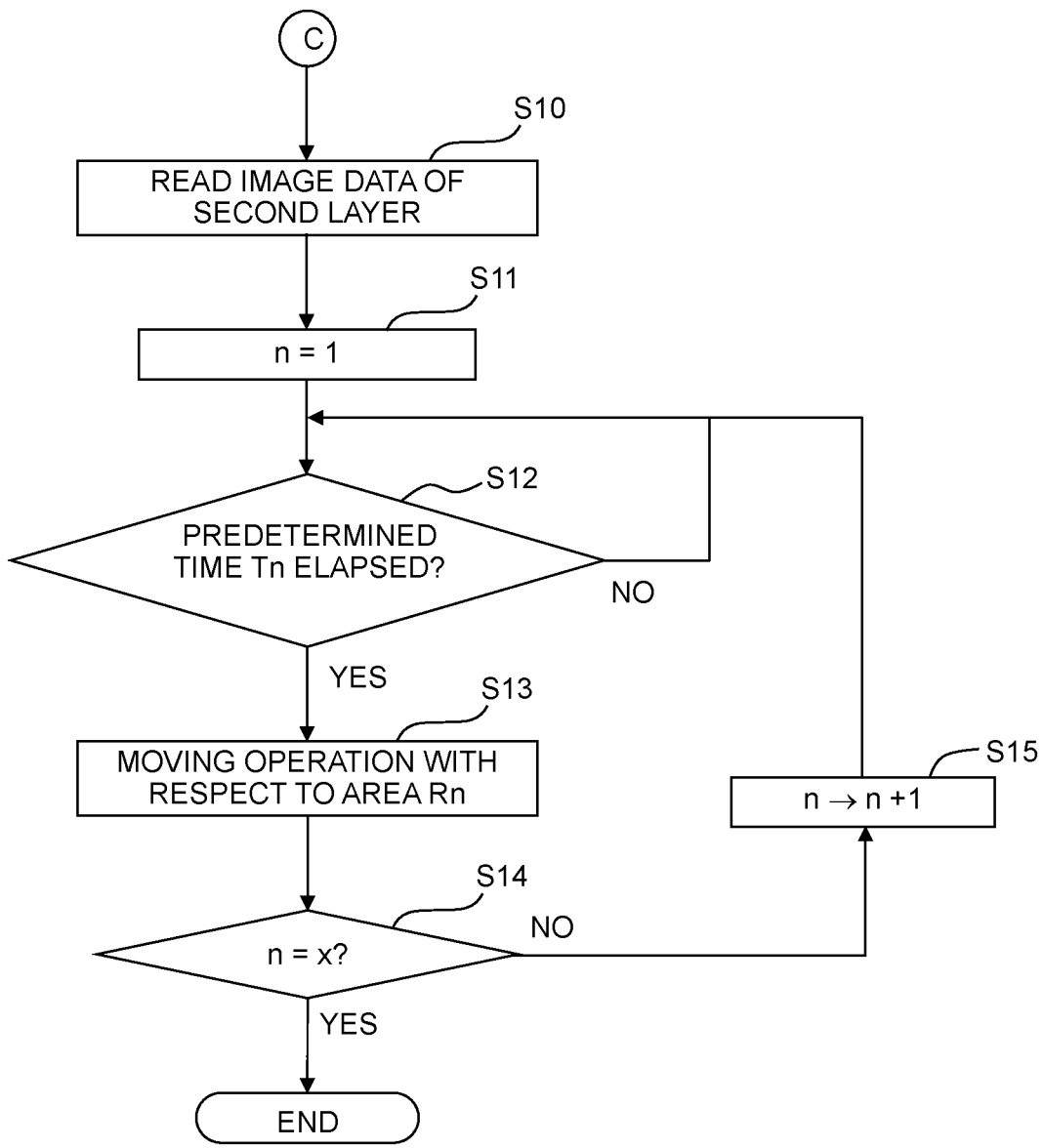

LIQUID DISCHARGING APPARATUS, CONTROLLING METHOD FOR LIQUID DISCHARGING APPARATUS AND MEDIUM STORING CONTROLLING PROGRAM FOR LIQUID DISCHARGING APPARATUS

CROSS REFERENCE TO RELATED APPLICATIONS

The present application claims priority from Japanese Patent Application No. 2020-145604, filed on Aug. 31, 2020, the disclosure of which is incorporated herein by reference in its entirety.

BACKGROUND

Field of the Invention

The present disclosure relates to a liquid discharging apparatus provided with a head having a plurality of nozzles, and a controller, and configured to execute a second recording processing with respect to a second area of a recording medium, after a predetermined time has elapsed since a first recording processing with respect to a first area of the recording medium, a controlling method for controlling the liquid discharging apparatus and a medium storing a controlling program for the liquid discharging apparatus.

Description of the Related Art

There is known a printing apparatus (liquid discharging apparatus) which repeatedly performs an operation of printing a plurality of first images on a continuous medium located at a print area (first recording processing), an operation of standing by for a predetermined time, an operation of printing a plurality of second images, respectively, on the plurality of first images (second recording processing), and an operation of conveying the medium. In this printing apparatus, the stand-by time (predetermined time) is determined based on a maximum liquid discharge amount per unit area of each of the plurality of first images and/or a kind of the continuous medium, etc. By doing so, it is possible to suppress any bleeding of the image and to shorten a time for the processing.

SUMMARY

In the above-described printing apparatus, the predetermined time is determined based on the discharge amount, and/or the kind of the medium, etc. However, the inventor of the present disclosure found out, as a result of various kinds of experiments, studies and considerations, that other than the discharge amount, etc., a kind of a colorant which is a component of the liquid is relevant to a drying time of the first image (consequently, to the bleeding of the image).

An object of the present disclosure is to provide a liquid discharging apparatus capable of suppressing any bleeding of the image and to shorten the time for the processing in a more ensured manner in a case of continuously executing the recording processing, a controlling method for controlling the liquid discharging apparatus and a medium storing a controlling program for the liquid discharging apparatus.

According to a first aspect of the present disclosure, there is provided a liquid discharging apparatus including:
 a head having a plurality of nozzles; and
 a controller,
 wherein the controller is configured to execute:
  a first recording processing of discharging liquid from the nozzles with respect to a first area of a recording medium based on first image data; and
  a second recording processing of discharging the liquid from the nozzles with respect to a second area, of the recording medium, which overlaps with or is adjacent to the first area based on second image data, after a predetermined time has elapsed since the first recording processing, and
 wherein the controller is configured to further execute a determining processing of determining the predetermined time based on color information of the first image data.

According to a second aspect of the present disclosure, there is provided a controlling method for controlling a liquid discharging apparatus including a head having a plurality of nozzles, the controlling method including:
 a first recording processing of discharging liquid from the nozzles with respect to a first area of a recording medium based on first image data; and
 a second recording processing of discharging the liquid from the nozzles with respect to a second area, of the recording medium, which overlaps with or is adjacent to the first area based on second image data, after a predetermined time has elapsed since the first recording processing,
 wherein the controlling method further comprising a determining processing of determining the predetermined time based on color information of the first image data.

According to a third aspect of the present disclosure, there is provided a non-transitory medium storing a program for controlling a liquid discharging apparatus including a head having a plurality of nozzles, and a controller, the program, when executed by the controller, causing the liquid discharging apparatus to execute:
 a first recording processing of discharging liquid from the nozzles with respect to a first area of a recording medium based on first image data; and
 a second recording processing of discharging the liquid from the nozzles with respect to a second area, of the recording medium, which overlaps with or is adjacent to the first area based on second image data, after a predetermined time has elapsed since the first recording processing,
 wherein the program causes the liquid discharging apparatus to further execute a determining processing of determining the predetermined time based on color information of the first image data.

According to the present disclosure, the predetermined time is determined based on the color information of the image data, thereby making it possible to suppress any bleeding of the image and to shorten the time for the processing in a more ensured manner in the case of continuously executing the recording processing.

BRIEF DESCRIPTION OF THE DRAWINGS

FIGS. 4A and 4B are a flow chart indicating a program executed by a CPU of the printer of FIG. 1.

FIG. 7 is a view depicting an example of an evaluation table used in step S23 of FIG. 5.

FIG. 9 is a table for explaining step S28 in FIG. 5.

FIGS. 11A and 11B are a flow chart indicating a program executed by the CPU in a third embodiment of the present disclosure.

FIGS. 13A and 13B are a flow chart indicating a program executed by the CPU in a fourth embodiment of the present disclosure.

DETAILED DESCRIPTION

First Embodiment

First, the overall configuration of a printer 100 according to a first embodiment of the present disclosure and the configuration of respective parts of the printer 100 will be explained, with reference to FIGS. 1 to 3.

Figure 1:
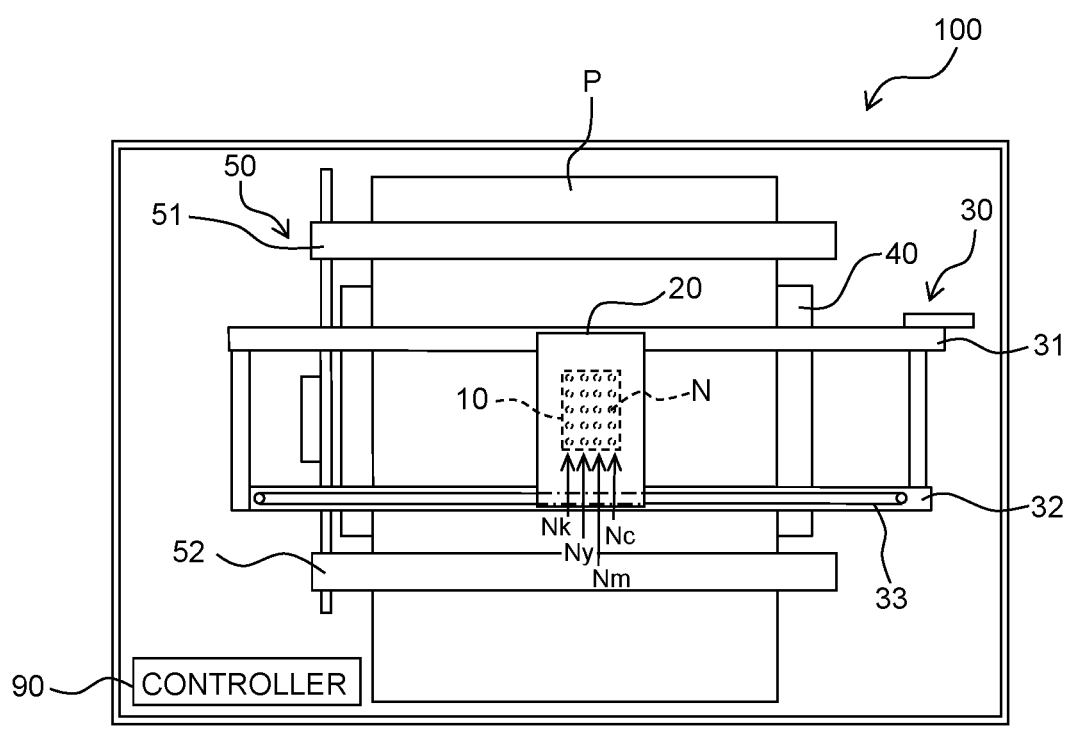
FIG. 1 is a plan view depicting the overall configuration of a printer according to a first embodiment of the present disclosure.
Figure 2:
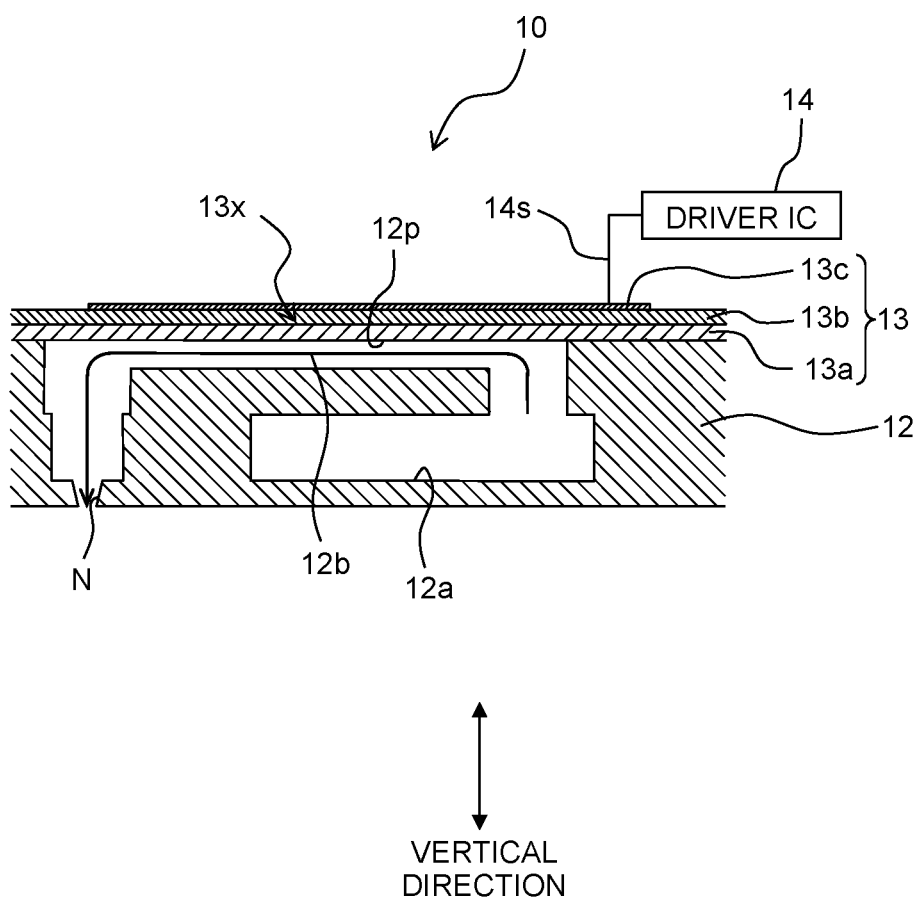
FIG. 2 is a cross-sectional view of a head depicted in FIG. 1.

As depicted in FIG. 1, the printer 100 is provided with: a head 10 having a plurality of nozzles N formed in a lower surface thereof; a carriage 20 holding the head 10; a moving mechanism 30 moving the carriage 20 and the head 10 in a moving direction (a direction orthogonal to the vertical direction); a platen 40 supporting a paper sheet (paper) P (recording medium) from therebelow; a conveyor 50 conveying the paper sheet P in a conveying direction (a direction orthogonal to the moving direction and the vertical direction); and a controller 90.

The plurality of nozzles N construct four nozzle rows (nozzle arrays) Nc, Nm, Ny and Nk arranged side by side in the moving direction. Each of the nozzle rows Nc, Nm, Ny and Nk is constructed of nozzles N, among the plurality of nozzles N, arranged side by side in the conveying direction. The nozzles N constructing the nozzle row Nc discharge a cyan ink, the nozzles N constructing the nozzle row Nm discharge a magenta ink; the nozzles N constructing the nozzle row Ny discharge an yellow ink, and the nozzles N constructing the nozzle row Nk discharge a black ink.

The moving mechanism 30 includes a pair of guides 31 and 32 supporting the carriage 20, and a belt 33 connected to the carriage 20. The pair of guides 31 and 32 and the belt 33 extend in the moving direction. In a case that a carriage motor 30m (see FIG. 3) is driven by control of the controller 90, the belt 33 runs, thereby causing the carriage 20 and the head 10 to move along the pair of guides 31 and 32.

The platen 40 is arranged at a location below the carriage 20 and the head 10. The paper sheet P is supported by an upper surface of the platen 40.

The conveyor 50 has two roller pairs 51 and 52. In the conveying direction, the head 10, the carriage 20 and the platen 40 are arranged between the roller pair 51 and the roller pair 52. In the case that a conveying motor 50m (see FIG. 3) is driven by the control of the controller 90, the roller pairs 51 and 52 rotate in a state that the paper sheet P is pinched therebetween, thereby conveying the paper sheet P in the conveying direction As depicted in FIG. 2, the head 10 includes a channel unit 12 and an actuator unit 13.

The plurality of nozzles N (see FIG. 1) are formed in a lower surface of the channel unit 12. A common channel 12a communicating with an ink tank (not depicted in the drawings) and a plurality of individual channels 12b each of which communicates with one of the plurality of nozzles N are formed in the inside of the channel unit 12. Each of the plurality of individual channels 12b is a channel from an outlet of the common channel 12a and reaching one of the nozzles N via a pressure chamber 12p. A plurality of pieces of the pressure chamber 12p are opened in an upper surface of the channel unit 12.

The actuator unit 13 includes a metallic vibration plate 13a arranged on the upper surface of the channel unit 12 so as to cover the plurality of pressure chambers 12p, a piezoelectric layer 13b arranged on an upper surface of the vibration plate 13a, and a plurality of individual electrodes 13c each of which is arranged on an upper surface of the piezoelectric layer 13b so as to face one of the plurality of pressure chambers 12p.

The vibration plate 13a and the plurality of individual electrodes 13c are electrically connected to a driver IC 14. The driver IC 14 maintains the potential of the vibration plate 13 at the ground potential, whereas the driver IC 14 changes the potential of each of the plurality of individual electrodes 13c. Specifically, the driver IC 14 generates a driving signal based on a control signal (a waveform signal FIRE and a selection signal SIN) from the controller 90, and supplies the driving signal to each of the plurality of individual electrodes 13c via a signal line 14s. With this, the potential of the individual electrode 13c is changed between a predetermined driving potential (VDD) and the ground potential (0V). In this situation, parts (actuator 13x) of the vibration plate 13a and the piezoelectric layer 13b, respectively, which are sandwiched between each of the plurality of individual electrodes 13c and one of the pressure chambers 12p corresponding thereto are deformed, thereby changing the volume of the pressure chamber 12p. As a result, pressure is applied to the ink inside the pressure chamber 12p, discharging the ink from the nozzle N. The actuator 13x is provided as a plurality of actuators 13x each of which is provided on one of the plurality of individual electrodes 13c (namely, on one of the nozzles N); each of the plurality of actuators 13x is deformable independently in accordance with the potential supplied to each of the plurality of individual electrodes 13c.

Figure 3:
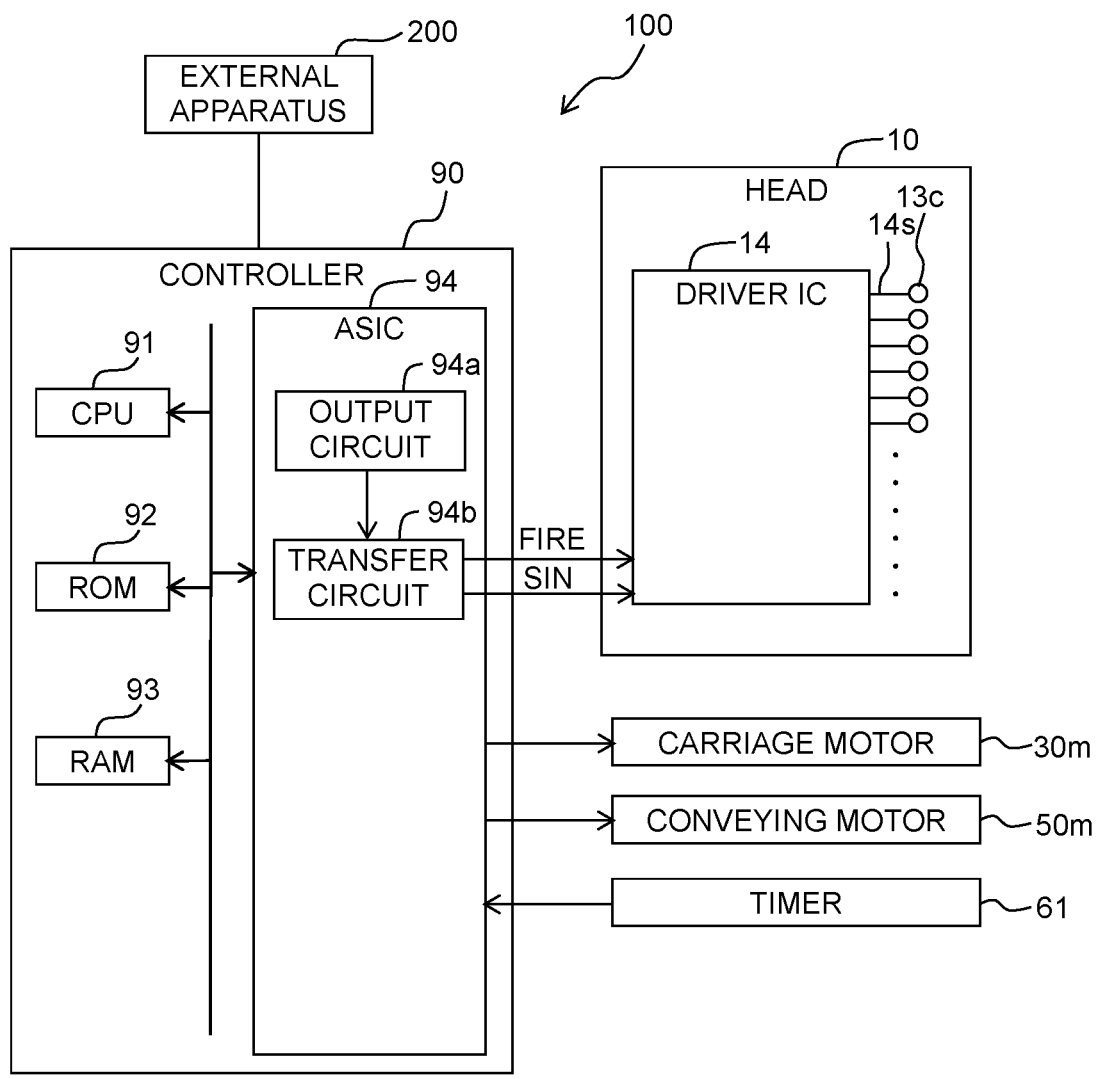
FIG. 3 is a block diagram depicting the electrical configuration of the printer of FIG. 1.

As depicted in FIG. 3, the controller 90 includes a CPU (Central Processing Unit) 91, a ROM (Read Only Memory) 92, a RAM (Random Access Memory) 93 and an ASIC (Application Specific Integrated Circuit) 94. Among the above-described elements, the CPU 91 and the ASIC 94 correspond to a "controller" of the present disclosure, and the RAM 93 corresponds to a "memory" of the present disclosure.

A program and data for allowing the CPU 91 and/or the ASIC 94 to perform a variety of kinds of control are stored in the ROM 92. The RAM 93 temporarily stores data (image data, etc.) which is used by the CPU 91 and/or the ASIC 94 in a case of executing a program. The controller 90 is connected to an external apparatus (personal computer, etc.) 200 so that the controller 90 is capable of communicating with the external apparatus 200, and executes a recording processing, etc., with the CPU 91 and/or the ASIC 94 based on data inputted from the external apparatus 200 or from an input part of the printer 100 (a switch, a button, etc., provided on an outer surface of a casing of the printer 100).

In the recording processing, the ASIC 94 drives the drive IC 14, the carriage motor 30m and the conveying motor 50m, by following an instruction from the CPU 91 and based on a recording instruction or command received from the external apparatus 200, etc. With this, a conveying operation of causing the conveyor 50 to convey the paper sheet P by a predetermined amount in the conveying direction, and a moving operation of discharging the ink(s) from the nozzles N while moving the carriage 20 and the head 10 in the moving direction are alternately performed. As a result, dots of the ink(s) are formed on the paper sheet P, and an image is recorded on the paper sheet P.

As depicted in FIG. 3, the ASIC 94 includes an output circuit 94a and a transfer circuit 94b.

The output circuit 94a generates the waveform signal FIRE and the selection signal SIN, and outputs these signals FIRE and SIN to the transfer circuit 94a for every recording cycle. The recording cycle is a time required for the paper sheet P to move relative to the head 10 only by a unit distance corresponding to the resolution of an image to be formed on the paper sheet P, and the recording cycle corresponds to one pixel (picture element).

The waveform signal FIRE is a signal in which four pieces of waveform data are arranged in series. The four pieces of the waveform data correspond to respective liquid amounts of the ink which are to be discharged from the nozzle N in one recording cycle which are "zero (no discharge)", "small", "medium" and "large", and have mutually different pulse numbers.

The selection signal SIN is a serial signal including selection data for selecting one waveform data among the four pieces of the waveform data as described above, and is generated for each of the actuators 13x and for each recording cycle based on the image data included in the recording instruction.

The transfer circuit 94b transfers the waveform signal FIRE and the selection signal SIN received from the output circuit 94a to the driver IC 14. The transfer circuit 94b has a LVDS (Low Voltage Differential Signaling) driver installed therein and corresponding to each of the signals FIRE and SIN, and transfers each of the signals FIRE and SIN to the driver IC 14, as a pulse-shaped differential signal.

The ASIC 94 controls the driver IC 14 in the recording processing, generates the driving signal based on the waveform signal FIRE and the selection signal SIN for each pixel, and supplies the driving signal to each of the plurality of individual electrodes 13c via the signal line 14s. With this, the ASIC 94 discharges, for each pixel, the ink of which droplet amount is selected from the four kinds of liquid droplet amounts (zero, small, medium and large) from each of the plurality of nozzles N, toward the paper sheet P.

The ASIC 94 is electrically connected also to a timer 61, in addition to the driver IC 14, the carriage motor 30m and the conveying motor 50m. The timer 61 outputs data indicating a point of time to the ASIC 94.

Next, an explanation will be given about a program executed by the CPU 91, with reference to FIGS. 4 to 9. The program is executed after the controller 90 receives the recording instruction from the external apparatus 200, etc.

In the present embodiment, the CPU 91 causes the head 10 and the moving mechanism 30 to execute, based on the recording instruction, a first moving operation (first recording processing) with respect to each of areas R1 to Rx (see FIG. 6) of the paper sheet P, and then executes a second moving operation (second recording processing) with respect to each of the areas R1 to Rx. Each of the areas R1 to Rx corresponds to a "first area" and a "second area" of the present disclosure. Namely, in the present embodiment, the "first area" and the "second area" are areas which are same as each other (which entirely overlap with each other). Each of the areas R1 to Rx is a rectangular area extending in the moving direction, and the areas R1 to Rx are arranged side by side in the conveying direction.

Figure 4A:
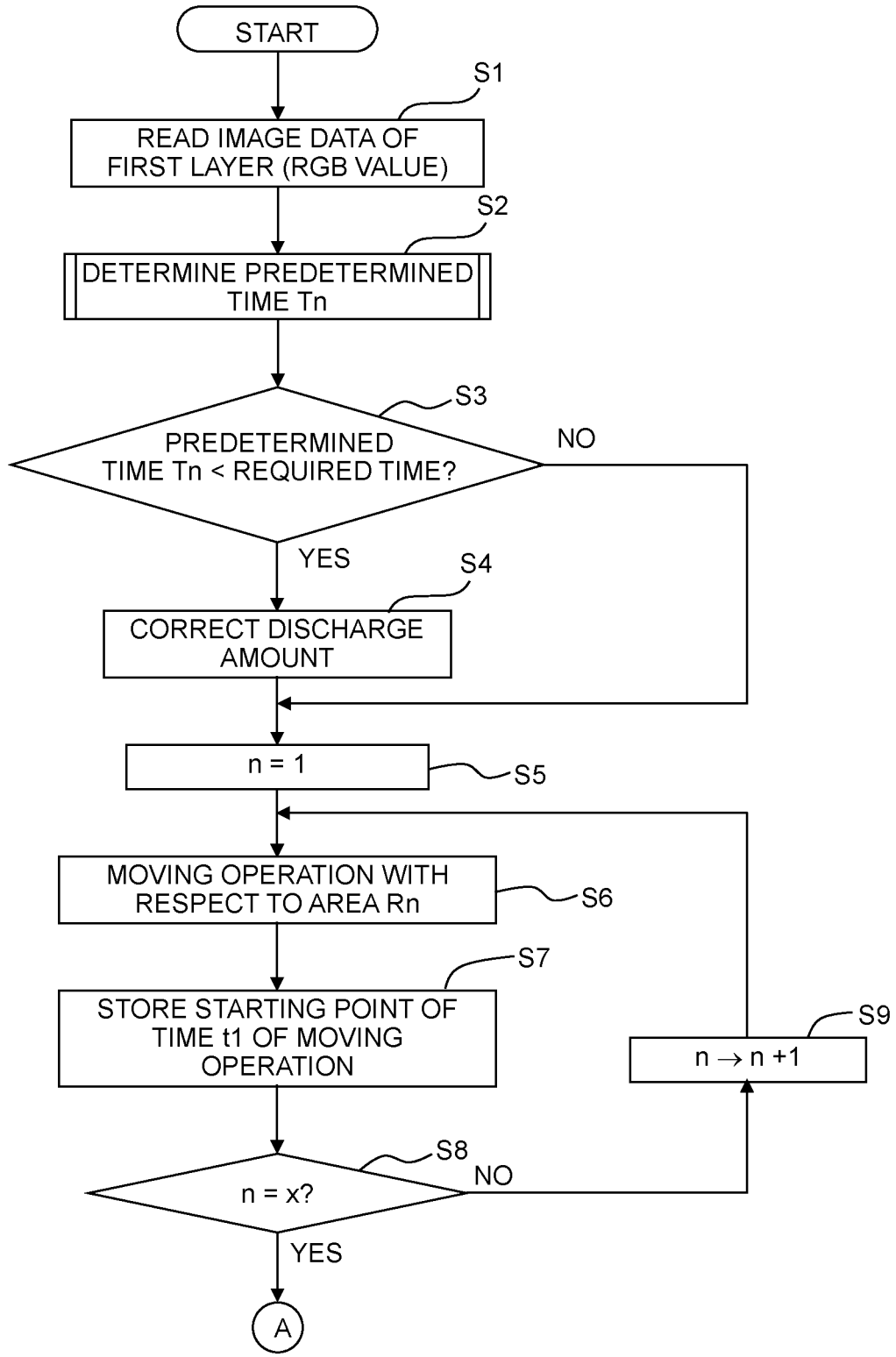

As depicted in FIG. 4A, the CPU 91 firstly reads, into the RAM 93, image data of a first layer among image data included in the recording instruction (step S1). The term "image data of a first layer" indicates image data to be used in the first moving operation (first recording processing) with respect to each of the areas R1 to Rx (see FIG. 6), and corresponds to "first image data" of the present disclosure.

In the present embodiment, the image data includes, as color information of the image, a RGB (Red, Green, Blue) value corresponding to a color of the image.

After step S1, the CPU 91 determines a predetermined time Tn for each of the areas R1 to Rx (n=1 to x) based on the color information (RGB value) of the image data (step S2). Step S2 corresponds to a "predetermined time determining processing" of the present disclosure.

Figure 5:
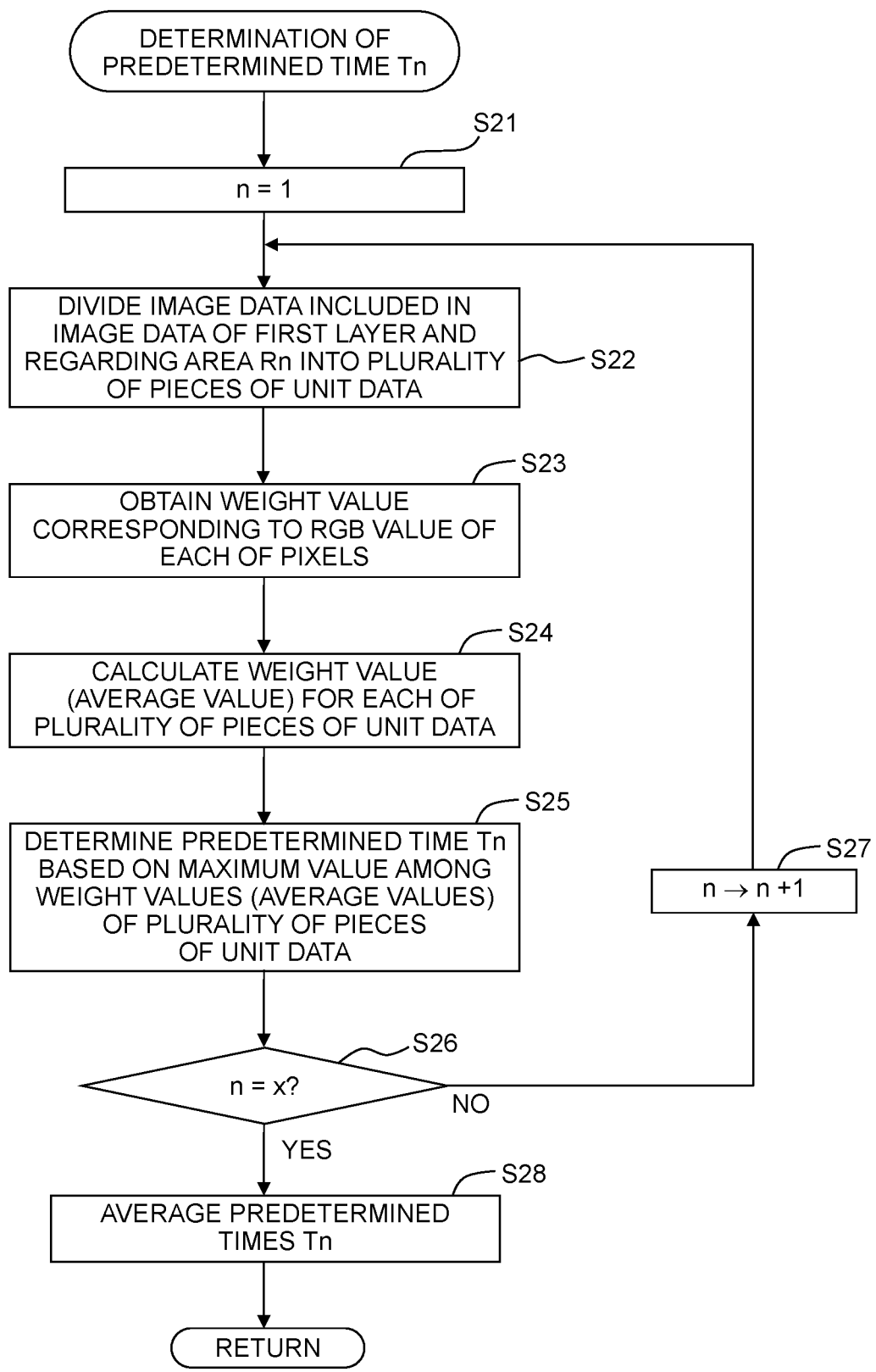
FIG. 5 is a flow chart indicating a subroutine of a processing of determining a predetermined time Tn depicted in FIG. 4A.

In step S2 (predetermined time Tn-determining processing), the CPU 91 firstly makes "n" to be "1", as depicted in FIG. 5 (step S21).

After step S21, the CPU 91 divides image data included in the image data of the first layer and regarding the area Rn into a plurality of pieces of unit data (step S22). The unit data is image data corresponding to each of unit areas S (see FIG. 6), and is constructed of a plurality of pixels. The unit area S is an area obtained by dividing each of the areas R1 to Rx into a plurality of divided areas (sections) (in the present embodiment, into a matrix form in the conveying direction and the moving direction).

After step S22, the CPU 91 obtains a weight value corresponding to a RGB value of each of the pixels included in the image data of the first layer, by using an evaluation table (see FIG. 7) stored in the ROM 92 (step S23). Namely, in step S23, the CPU 91 obtains weight values for the plurality of pieces of the unit data respectively, each of the plurality of pieces of the unit data corresponding to one of the plurality of unit areas S constructing the area Rn.

As depicted in FIG. 7, the evaluation table is a table in which the RGB value (gradation value from 0 to 255) and the weight value are made to correspond to each other. The weight value is a value indicating easiness of bleeding of an image (hardness of drying of an ink); in the present embodiment, as the numerical value of the weight value is greater, the weight value indicates that the bleeding of the image is more likely to occur (the ink is harder to dry), and that a required time (time required for suppressing the bleeding of the image) is longer. The weight value is an example of relevant information relevant to the predetermined time.

The evaluation table is, for example, prepared at a time of manufacturing the printer 100 based on a result of an experiment, and is stored in the ROM 92.

After step S23, the CPU 91 calculates an average value of the plurality of pieces of the weight value for each of the plurality of pieces of unit data (step S24). Specifically, in step S24, the CPU 91 adds weight values of the plurality of pixels constructing each of the plurality of pieces of unit data so as to obtain an added value, and divides the added value by the area of each of the plurality of unit areas S, thereby calculating the average value of the weight values for each of the plurality of pieces of unit data.

Figure 8:
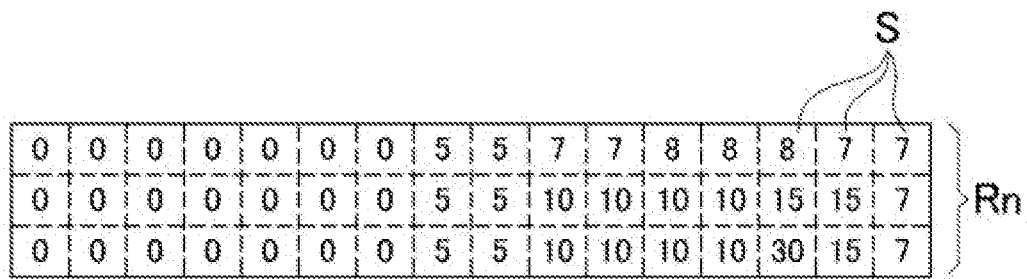
FIG. 8 is a schematic view for explaining step S25 of FIG. 5.

After step S24, the CPU 91 determines the predetermined time Tn based on a maximum value among the average values of the weight values of the respective plurality of pieces of unit data calculated in step S24 (step S25). For example, as depicted in FIG. 8, with respect to the plurality of pieces of unit data each corresponding to one of the plurality of unit areas S, the CPU 91 calculates the average values of the weight values of the respective plurality of pieces of unit data calculated in step S24 (the values each of which is written inside one of the plurality of unit areas S), and the CPU 91 determines the predetermined time Tn based on the maximum value "30" among the calculated average values. In the present embodiment, as the numerical value of the maximum value is greater, the predetermined time Tn is made to be longer. The maximum value is an example of any one of the plurality of pieces of relevant information each of which is relevant to one of the plurality of pieces of unit data and relevant information by which the predetermined time is made to be longest.

After step S25, the CPU 91 determines whether or not "n=x" is satisfied (step S26).

In a case that the "n=x" is not satisfied (step S26: NO), the CPU 91 makes "n" to be "n+1" (step S27), and returns the processing to step S22.

In a case that the "n=x" is satisfied (step S26: YES), the CPU 91 averages the predetermined times Tn determined for the respective areas Rn (n=1 to x) (step S28).

In the present embodiment, there is a plurality of sets corresponding to the plurality of areas R1 to Rx, in a case that the first moving operation (first recording processing) and the second moving operation (second recording processing) with respect to each of the areas R1 to Rx are defined as one set included in the plurality of sets. In step S28, the CPU 91 determines the predetermined time Tn so that the predetermined time Tn becomes to be same among the sets of the first moving operation (first recording processing) and the second moving operation (second recording processing), each of the sets concerning (corresponding to) one of the areas R1 to Rx.

Here, step S28 will be specifically explained, with reference to FIG. 9.

In an example depicted in FIG. 9, a time required for (executing) one time of the moving operation is 10 (ten) seconds. The first moving operation with respect to the second area R2 is stared after 10 seconds since the first moving operation with respect to the area R1 has been started. Then, the first moving operation with respect to the third area R3 is stared further after 10 seconds. Such a processing is performed up to the area Rx; and then the second moving operation with respect to each of the areas R1 to Rx is executed. The predetermined time Tn determined in step S25 is: 20 seconds with respect to the area R1, 100 seconds with respect to the area R2, 10 seconds with respect to the area R3, 0 (zero) seconds with respect to the area R4, and 10 seconds with respect to the area R5. A startable point of time t2 for the second moving operation for each of the areas Rn is a point of time obtained by adding the predetermined time Tn to a starting point of time t1 of the first moving operation, for each of the areas Rn, corresponding thereto. A normal starting point of time t2' for the second moving operation for each of the areas Rn is a point of time at which the moving operation is started in a case that the moving operation is continuously executed, without providing any waiting time between the moving operations, with the time required for one time of the moving operation being determined as 10 seconds.

In the example depicted in FIG. 9, since the startable point of time t2 for the second moving operation for each of the areas R1 and R3 to R5 is before the normal starting point of time t2', there is no need to make the second moving operation to stand by. In contrast, in the area R2, the startable point of time t2 for the second moving operation therefor is after the normal starting point of time t2', there is need to make the second moving operation to stand by. In this case, only in the area R2, which is a part of the areas R1 to Rx, the second moving operation is made to stand by. Due to this, the drying time for the image of the first layer is made to be different among the areas R1 to Rx, which in turn leads to such a possibility that any unevenness in color might occur among the areas R1 to Rx.

In view of such a possibility, in the present embodiment, the predetermined times Tn determined with respect to the respective areas Rn (n=1 to x) are averaged to be adjusted in step S28 so that the predetermined times Tn become to be mutually same among the respective areas Rn (n=1 to x). With this, it is possible to avoid such a situation that the second moving operation is made to stand by only in a part of the areas Rn (in this case, the area R2) and to suppress any color unevenness in the image.

The "image data of the first layer (first image data)" includes, for example, "first divided image data" for executing the first moving operation with respect to the area R1 (an example of the "first area") in a case that the area R1 is arranged at a position at which the area R1 overlaps, in the vertical direction, with a movable range of the head 10 (a range in which the head 10 is movable by the driving of the moving mechanism 30 and discharges the ink from the plurality of nozzles N) (an example of a "first position"); and "second divided image data" for executing the first moving operation and discharging the ink from the plurality of nozzles N with respect to the area R2 (an example of "another first area") in a case that the area R2 is arranged at a position at which the area R2 overlaps, in the vertical direction, with the movable range of the head 10 (an example of a "second position").

The "image data of the second layer (second image data)" includes, for example, "third divided image data" for executing the second moving operation and discharging the ink from the plurality of nozzles N with respect to the area R1 (an example of the "second area") in a case that the area R1 is arranged at a position at which the area R1 overlaps, in the vertical direction, with the movable range of the head 10 (an example of the "first position"); and "fourth divided image data" for executing the second moving operation and discharging the ink from the plurality of nozzles N with respect to the area R2 (an example of "another second area") in a case that the area R2 is arranged at a position at which the area R2 overlaps, in the vertical direction, with the movable range of the head 10 (second position).

The predetermined time Tn includes a first predetermined time ("20 seconds" in FIG. 9) between the first moving operation with respect to the area R1 (the first recording processing based on the first divided image data) and the second moving operation with respect to the area R1 (the second recording processing based on the third divided image data), and a second predetermined time ("100 seconds" in FIG. 9) between the first moving operation with respect to the area R2 (the first recording processing based on the second divided image data) and the second moving operation with respect to the area R2 (the second recording processing based on the fourth divided image data). In step S28, the CPU 91 averages the predetermined times Tn so that the first predetermined time and the second predetermined time becomes to be mutually same.

After step S28, the CPU 91 ends this subroutine.

After step S2 (the predetermined time Tn-determining processing), the CPU 91 determines whether or not the predetermined time Tn determined in step S2 is less than a required time (step S3) for each of the areas Rn (n=1 to x), as depicted in FIG. 4A. The required time is the predetermined time based on the weight values determined in step S25, and indicates the predetermined time before being averaged in step S28.

In a case that a certain area Rn in which the predetermined time Tn is less than the required time is present among the areas R1 to Rx (step S3: YES), the CPU 91 corrects the image data for the first layer (first image data) so that an amount of the ink to be discharged from the plurality of nozzles N in the first moving operation (first recording processing) with respect to the certain area Rn becomes to be small (step S4). Step S4 corresponds to a "discharge amount correcting processing" of the present disclosure.

After step S4, or in a case that the predetermined time is not less than the required time in all the areas R1 to Rx (step S3: NO), the CPU 91 makes the "n" to be "1" (step S5).

After step S5, the CPU 91 causes the head 10 and the moving mechanism 30 to execute the moving operation with respect to an area Rn based on image data which is included in the image data of the first layer and which corresponds to the area Rn (step S6). Step S6 corresponds to a "first recording processing" of the present disclosure.

After step S6, the CPU 91 causes the RAM 93 to store a point of time obtained from the timer 61 (see FIG. 3) at the time of the start of step S6, as a "starting point of time t1 of the first moving operation" (step S7). Step S7 corresponds to a "storing processing" of the present disclosure. The starting point of time t1 corresponds to a "first recording processing-starting point of time" of the present disclosure.

After step S7, the CPU 91 determines whether or not "n=x" is satisfied (step S8).

In a case that the "n=x" is not satisfied (step S8: NO), the CPU 91 makes the "n" to be "n+1" (step S9), and returns the processing to step S6.

In a case that the "n=x" is satisfied (step S8: YES), the CPU 91 reads, into the RAM 93, image data for a second layer among the image data included in the recording instruction (step S10). The "image data of the second layer" is image data to be used in the moving operation (second recording processing) with respect to the areas R1 to Rx (see FIG. 6), and corresponds to "second image data" of the present disclosure.

After step S10, the CPU 91 makes the "n" to be "1" (step S1i).

After step S11, and after starting the first moving operation with respect to the area Rn, the CPU 11 determines whether or not the predetermined time Tn determined in step S2 has elapsed (step S12). Specifically, the CPU 91 determines, in step S12, whether or not a point of time obtained from the timer 61 (see FIG. 3) has reached a point of time obtained by adding the predetermined time Tn determined in step S2 to the starting point of time t1 stored in step S7.

In a case that the CPU 91 determines, after starting the first moving operation with respect to the area Rn, that the predetermined time Tn determined in step S2 has not elapsed (step S12: NO), the CPU 91 repeats the processing of step S12.

In a case that the CPU 91 determines, after starting the first moving operation with respect to the area Rn, that the predetermined time Tn determined in step S2 has elapsed (step S12: YES), the CPU 91 causes the head 10 and the moving mechanism 30 to execute the moving operation with respect to the area Rn based on the image data included in the image data of the second layer and corresponding to the area Rn (step S13). Step 13 corresponds to a "second recording processing" of the present disclosure. Namely, in a case that the CPU 91 determines that the point of time obtained from the timer 61 (see FIG. 3) has reached the point of time obtained by adding the predetermined time Tn determined in step S2 to the starting point of time t1 stored in step S7 (step S12: YES), the CPU 91 causes the head 10 to discharge the ink from the plurality of nozzles N with respect to the area Rn, based on the image data included in the image data of the second layer and corresponding to the area Rn. Note that in the present embodiment, although the area Rn (n: an integer of not less than 2 (two)) is an area adjacent to an area $R_{n-1}$, the area Rn may be an area overlapping with the area $R_{n-1}$.

After step S13, the CPU 91 determines whether or not "n=x" is satisfied (step S14).

In a case that "n=x" is not satisfied (step S14: NO), the CPU 91 makes the "n" to be "n+1" (step S15), and returns the processing to step S12.

In a case that "n=x" is satisfied (step S14: YES), the CPU 91 ends the subroutine.

As described above, according to the present embodiment, the CPU 91 determines the predetermined time Tn based on the color information (RGB value) of the image data (see steps S23 to S25 of FIG. 5, FIG. 7, etc.). The color information is relevant to the kind of a colorant which is a component of the ink, and is relevant to a drying time of an image of the first layer (first image) (and consequently to the bleeding of the image). By determining the predetermined time Tn based on the color information of the image data, it is possible to determine the predetermined time Tn appropriately. Accordingly, it is possible to suppress any bleeding of the image and to shorten the time for the processing in a more ensured manner, in the case of continuously executing the recording processing.

In step S2 (predetermined time Tn-determining processing), the CPU 91 determines the predetermined time Tn based on the weight values (the relevant information relevant to the predetermined time) of the plurality of pieces of the unit data constructing the image data of the first layer (first image data) (see steps S23 to S25 of FIG. 5). In this case, by determining the predetermined time Tn based on the information of the plurality of pieces of unit data, rather than based on the entirety of the first image data, it is possible to determine the predetermined time Tn more appropriately.

Further, in step S2 (the predetermined time Tn-determining processing), the CPU 91 determines the predetermined time Tn based on the maxim value (the relevant information by which the predetermined time is made to be longest) among the weight values (average values) of the plurality of pieces of the unit data (see step S25 of FIG. 5). In this case, it is possible to suppress the occurrence of such a problem that the bleed occurs due to a short predetermined time Tn in a certain unit area S.

In step S2 (the predetermined time Tn-determining processing), the CPU 91 determines the predetermined times Tn so that the predetermined times Tn becomes to be same among the sets of the first moving operation (first recording processing) and the second moving operation (second recording processing), each of the sets concerning with respect to one of the areas R1 to Rx (see step S28 of FIG. 5). In this case, since the predetermined times Tn are averaged, the unevenness in the image is suppressed, thereby improving the image quality.

After step S2 (the predetermined time Tn-determining processing), the CPU 91 corrects the image data of the first layer (first image data) so that the amount of the ink to be discharged from the plurality of nozzles N becomes to be small in the first moving operation (first recording processing) (step S4). In a case that the predetermined times Tn are averaged in step S28, although there might arise such a problem that the bleeding might occur due to a short predetermined time Tn in a certain area Rn, it is possible to suppress the occurrence of this problem by correcting the amount of the ink as described above.

Figure 6:
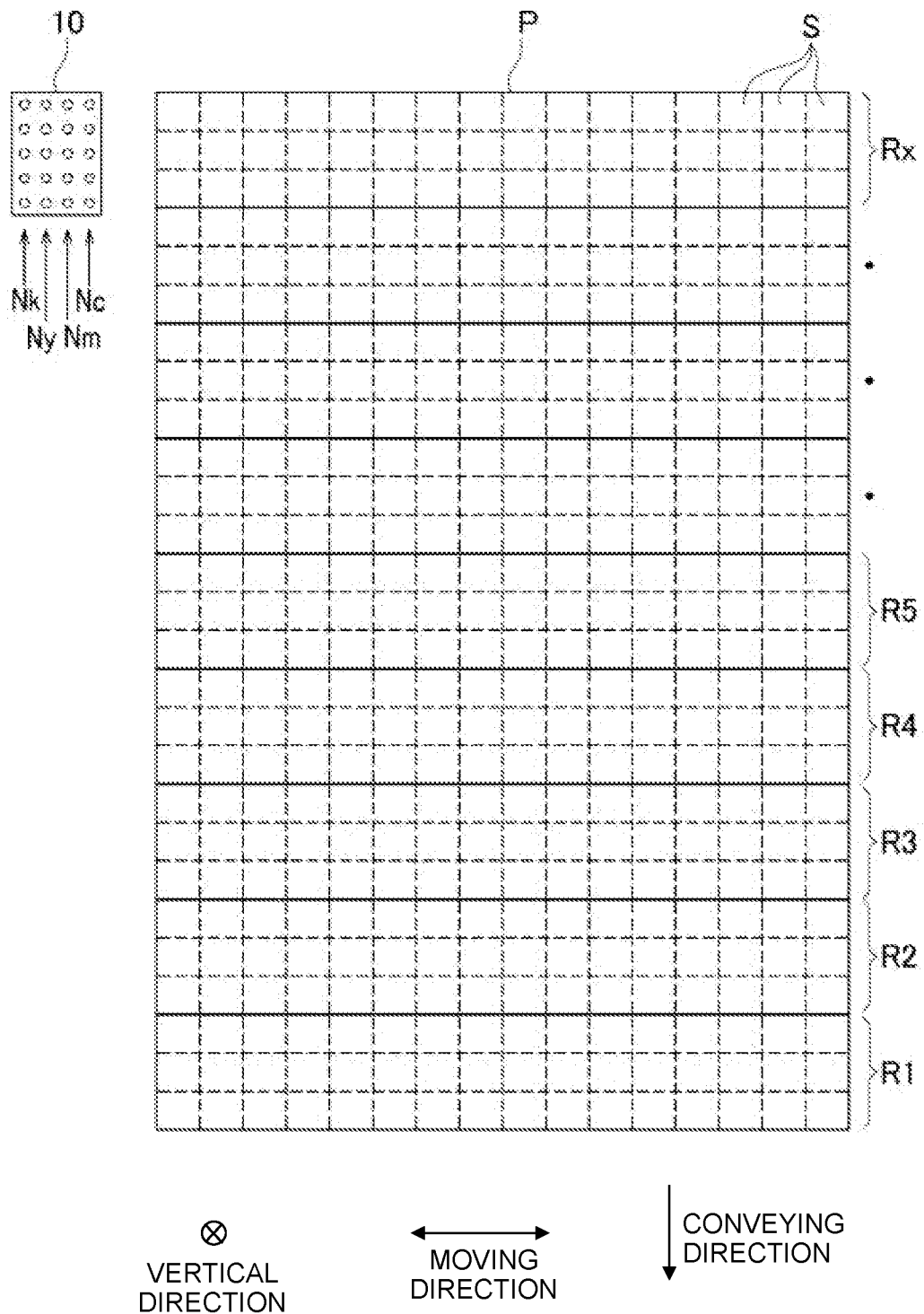
FIG. 6 is a schematic view depicting respective areas corresponding to a moving operation.

The area (first area) which is an object of the first moving operation (first recording operation) and the area Rn (second area) which is an object of the second moving operation (second recording operation) each extend in the moving direction (the orthogonal direction orthogonal to the conveying direction) and overlap with each other (see FIG. 6). In this case, it is possible to achieve a satisfactory color development in the image by performing the recordings in the overlapping manner in the same area Rn, and it is possible to suppress the bleeding of the image by appropriately determining the predetermined time Tn.

Second Embodiment

Next, a second embodiment of the present disclosure will be explained, with reference to FIG. 10.

The second embodiment is similar to the first embodiment, except that the content of processing in step S2 (the predetermined time Tn-determining processing) is different from that of the first embodiment.

Figure 10:
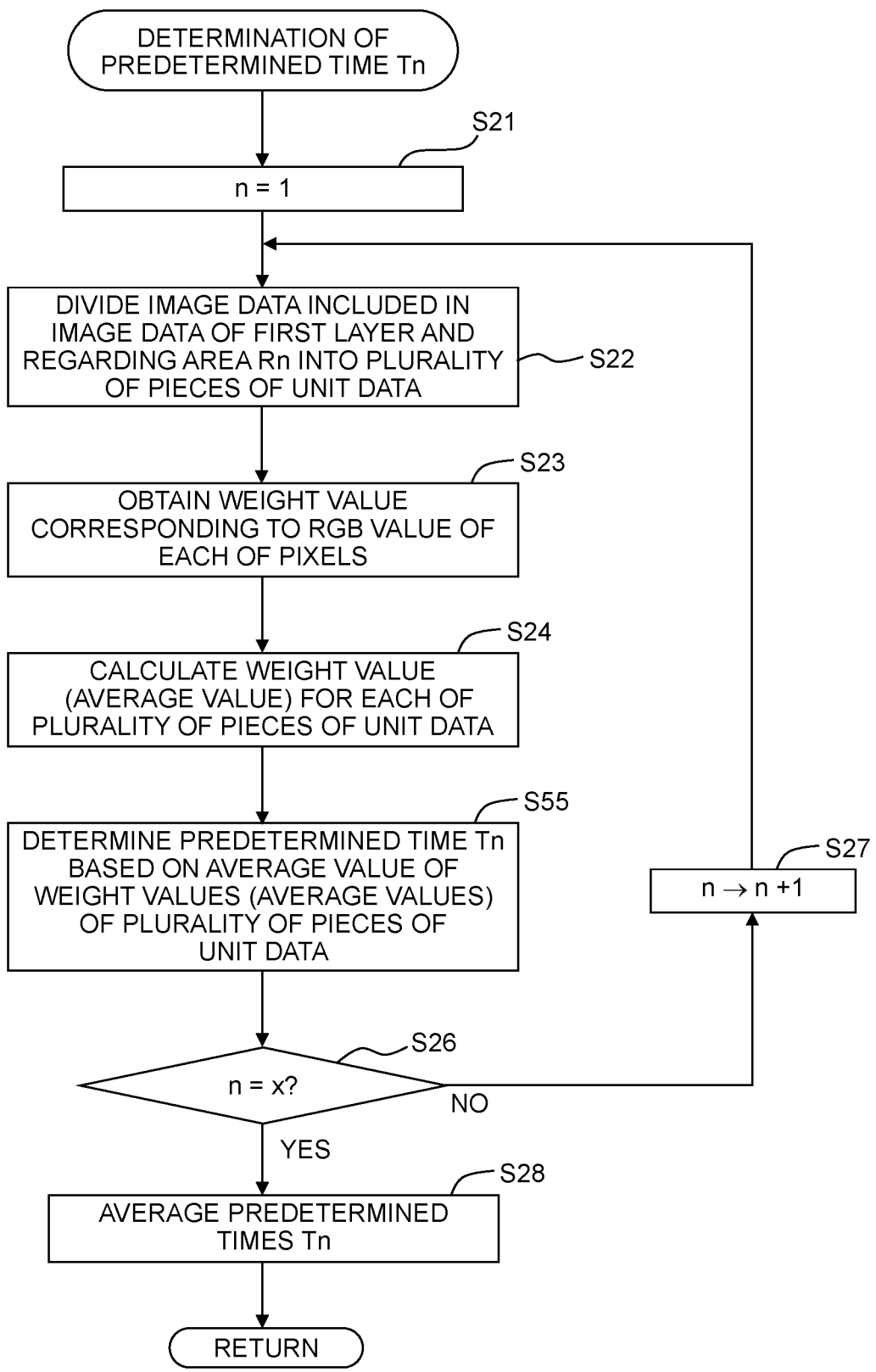
FIG. 10 is a flow chart indicating a subroutine of the processing of determining the predetermined time Tn according to a second embodiment of the present disclosure.

In the second embodiment, a subroutine of FIG. 10 is applied, as step S2 (the predetermined time Tn-determining processing), instead of the subroutine of FIG. 5. The difference between the subroutine in FIG. 5 and the subroutine in FIG. 10 is the difference between steps S25 and S55. In the first embodiment, the CPU 91 determines, in step S25, the predetermined time Tn based on the "maximum value" among the average values of the weight values of the respective plurality of pieces of unit data calculated in step S24, whereas in the second embodiment, the CPU 91 determines, in step S55, the predetermined time Tn based on the "average value" in the average values of the weight values of the respective plurality of pieces of unit data calculated in step S24. For example, the CPU 91 adds the values each of which is described in one of the respective unit areas S depicted in FIG. 8 (each of which is the average value of the weight values of one of the plurality of pieces of unit data) so as to obtain an added value, and divides the added value by the area of the unit area Rn to thereby calculate the "average value"; the CPU 91 determines the predetermined time Tn base on the "average value".

Although the second embodiment is different from the first embodiment in view of that the predetermined time Tn is determined based on the "average value", rather than based on the "maximum value", the second embodiment has the configuration similar to that of the first embodiment that the predetermined time Tn is determined based on the information of the plurality of pieces of unit data, rather than based on the information of the entirety of the first image data. Accordingly, it is possible to determine the predetermined time Tn more appropriately.

Third Embodiment

Next, a third embodiment of the present disclosure will be explained, with reference to FIGS. 11A, 11B and 12.

In the first embodiment, the CPU 91 determines the predetermined time Tn based on the RGB value corresponding to the color of the image, as the color information (see step S23 of FIG. 5). In contrast, in the third embodiment, the CPU 91 determines the predetermined time Tn based on a CMYK (Cyan, Magenta, Yellow and Black) value corresponding to the color of the ink, as the color information (see step S63 of FIG. 12).

Figure 11A:
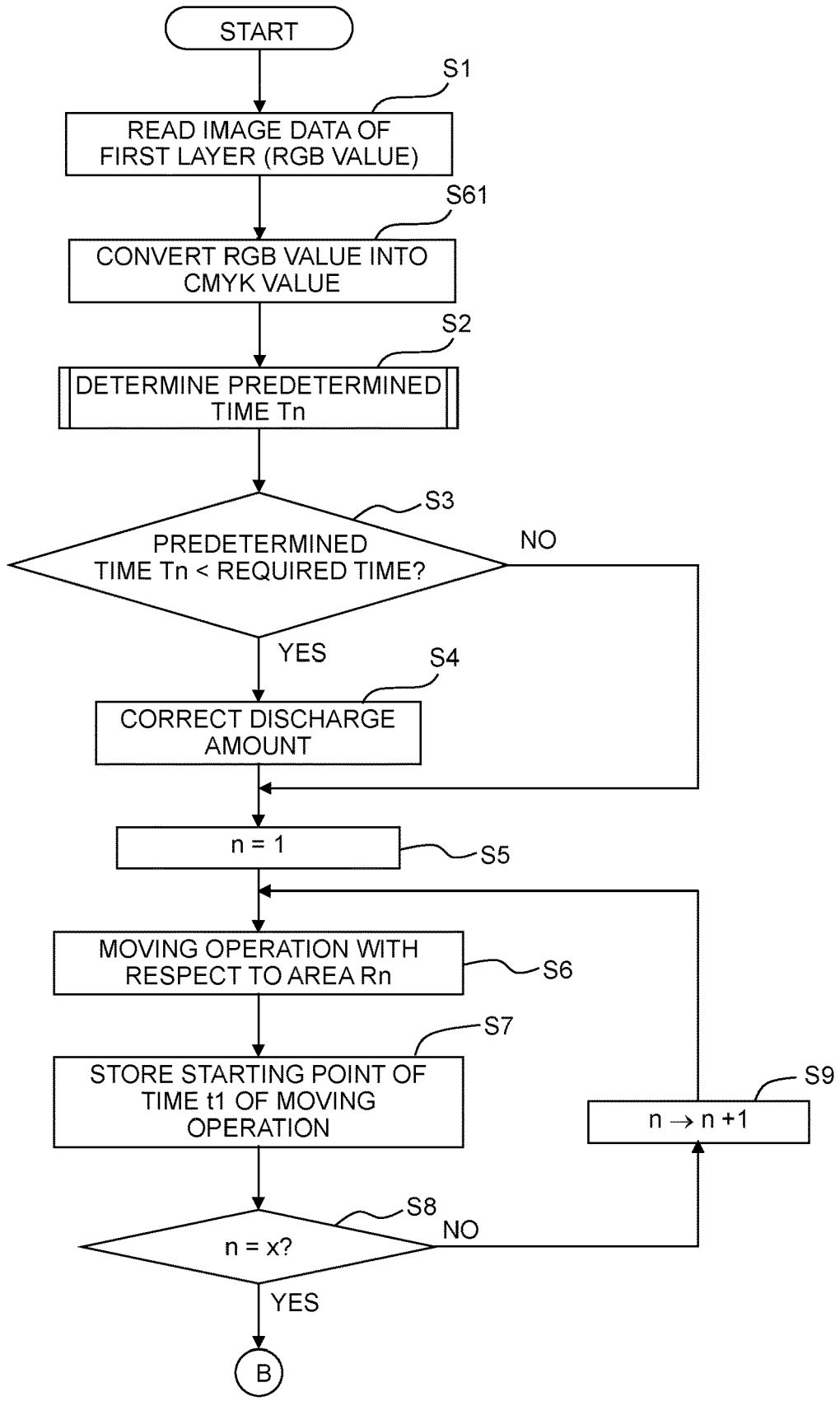

In the third embodiment, as depicted in FIG. 11A, after the CPU 91 reads, into the RAM 93, the image data of the first layer (RGB value) (step S1), the CPU 91 converts the RGB value into the CMYK value (step S61), and then executes step S2 (the predetermined time Tn-determining processing). Step S61 corresponds to a "converting processing" of the present disclosure. A program depicted in FIGS. 11A and 11B is similar to the program of FIGS. 4A and 4B, except for the point that step S61 is added between step S1 and step S2.

Figure 12:
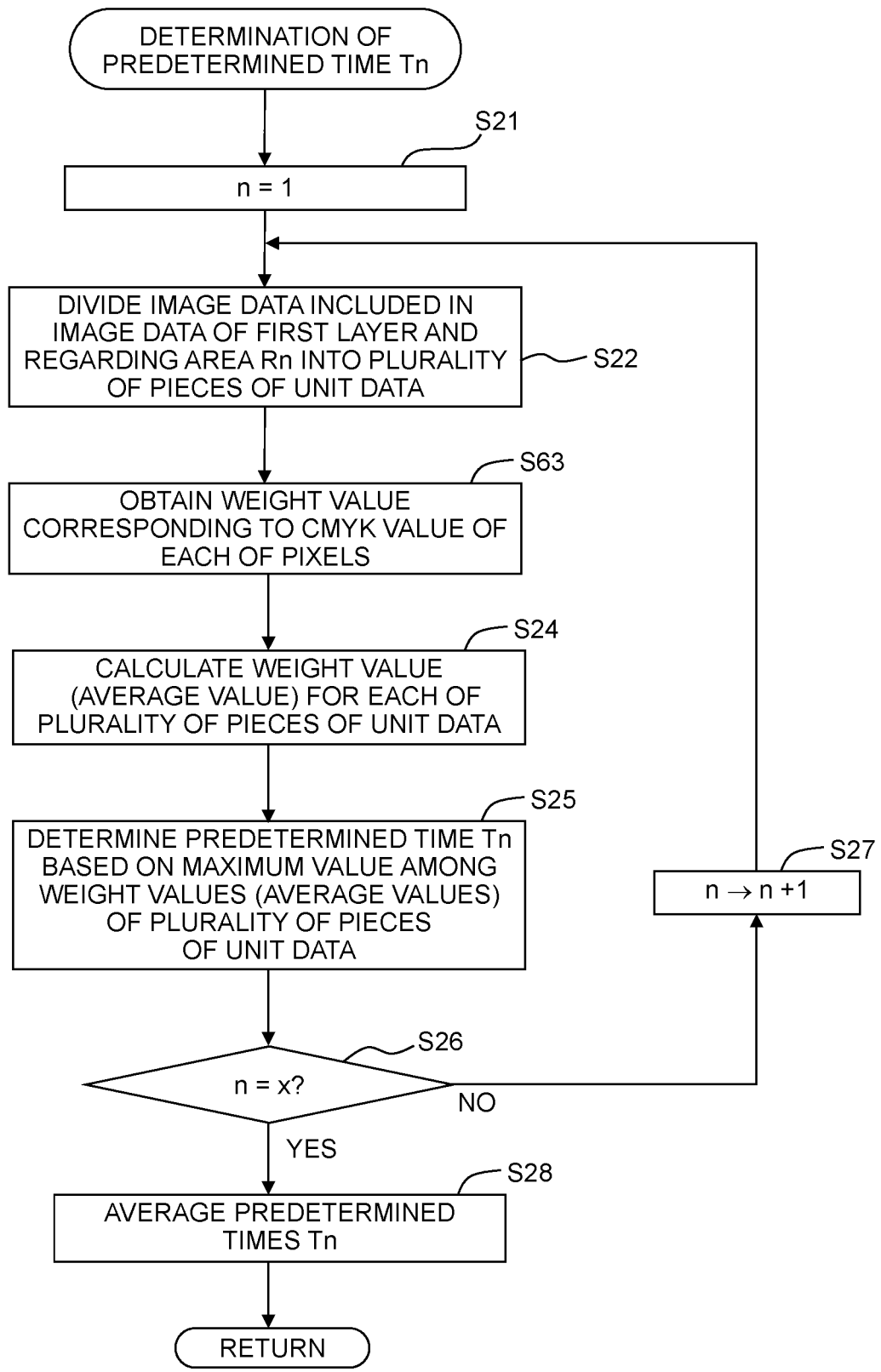
FIG. 12 is a flow chart indicating a subroutine of the processing of determining the predetermined time Tn according to the third embodiment of the present disclosure.

In the third embodiment, a subroutine of FIG. 12 is applied, as step S2 (the predetermined time Tn-determining processing), instead of the subroutine of FIG. 5. The difference between the subroutine in FIG. 5 and the subroutine in FIG. 12 is the difference between steps S23 and S63. In the first embodiment, the CPU 91 obtains, in step S23, the weight values each corresponding to the RGB value of one of the pixels, whereas in the third embodiment, the CPU 91 obtains, in step S63, weight values each corresponding to the CMYK value of one of the pixels. Although the evaluation table in which the RGB value is made to correspond to the weight value is used in step S23 (see FIG. 7), an evaluation table (not depicted in the drawings) in which the CMYK value is made to correspond to the weight value is used in step S63.

Fourth Embodiment

Figure 13A:
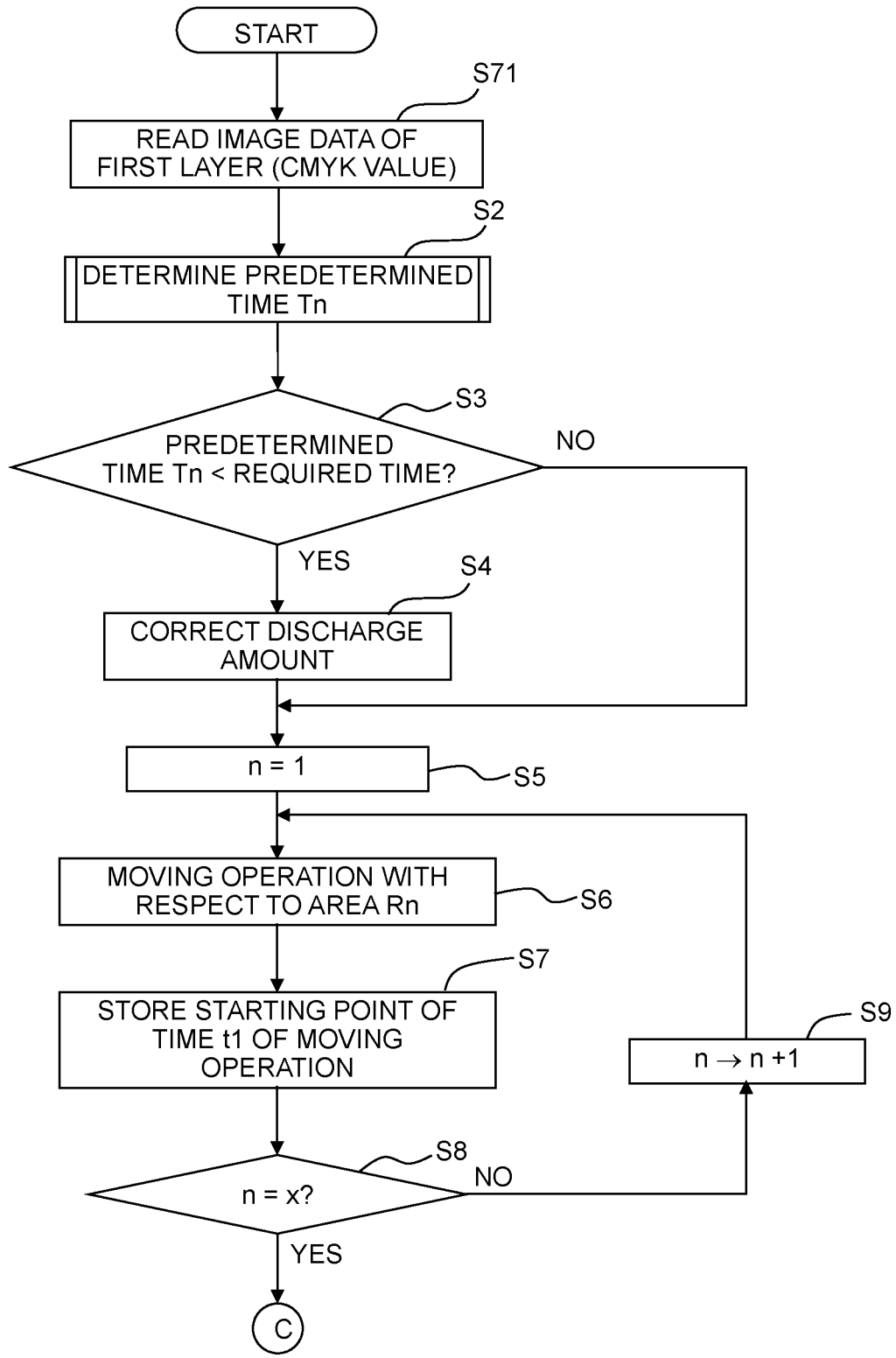

Next, a fourth embodiment of the present disclosure will be explained, with reference to FIGS. 13A and 13B.

In the fourth embodiment, the CPU 91 determines the predetermined time Tn based on a CMYK value corresponding to the color of the ink as the color information, in a similar manner as in the third embodiment.

In the third embodiment (FIGS. 11A and 11B), the image data received from the external apparatus 200, etc., is constructed of the RGB value, and the CPU 91 of the printer 100 converts the RGB value into the CMYK value (step S61). In contrast, in the fourth embodiment, the external apparatus 200 converts the RGB value into the CMYK value, and the CPU 91 receives the CMYK value from the external apparatus 200 (step S71 of FIG. 13A). Step S71 corresponds to a "receiving processing" of the present disclosure. A program indicated in FIGS. 13A and 13B is similar to the program of FIGS. 4A and 4B, except that step S1 is replaced with step S71. The CPU 91 determines the predetermined time Tn based on the CMYK value received in step S71 (step S2).

In the fourth embodiment, the subroutine of FIG. 12 is applied as step S2 (the predetermined time Tn-determining processing), in a similar manner as in the third embodiment.

In the third and fourth embodiments, the CPU 91 determines the predetermined time Tn based on the color information (CMYK value) of the image data (see step S63 and steps S24 and S25 of FIG. 12). The CMYK value is relevant to the kind of the colorant which is a component of the ink, similarly to the RGB value, and is relevant to the drying time of the image of the first layer (first image) (and consequently to the bleeding of the image). Accordingly, also in the third and fourth embodiments, by determining the predetermined time Tn based on the color information of the image data in a similar manner as in the first embodiment, it is possible to determine the predetermined time Tn appropriately. Further, in a case of executing the recording processing continuously, it is possible to suppress the bleeding of the image and to shorten the processing time in a more ensured manner.

Fifth Embodiment

Next, a fifth embodiment of the present disclosure will be explained, with reference to FIGS. 14A and 14B.

In the first embodiment, after the "starting" of the first moving operation with respect to the area Rn, the CPU 91 determines, in step S12 (see FIG. 4B), whether or not the predetermined time Tn determined in step S2 has elapsed. In contrast, in the fifth embodiment, after the "end" of the first moving operation with respect to the area Rn, the CPU 91 determines whether or not the predetermined time Tn determined in step S2 has elapsed.

Figure 14A:
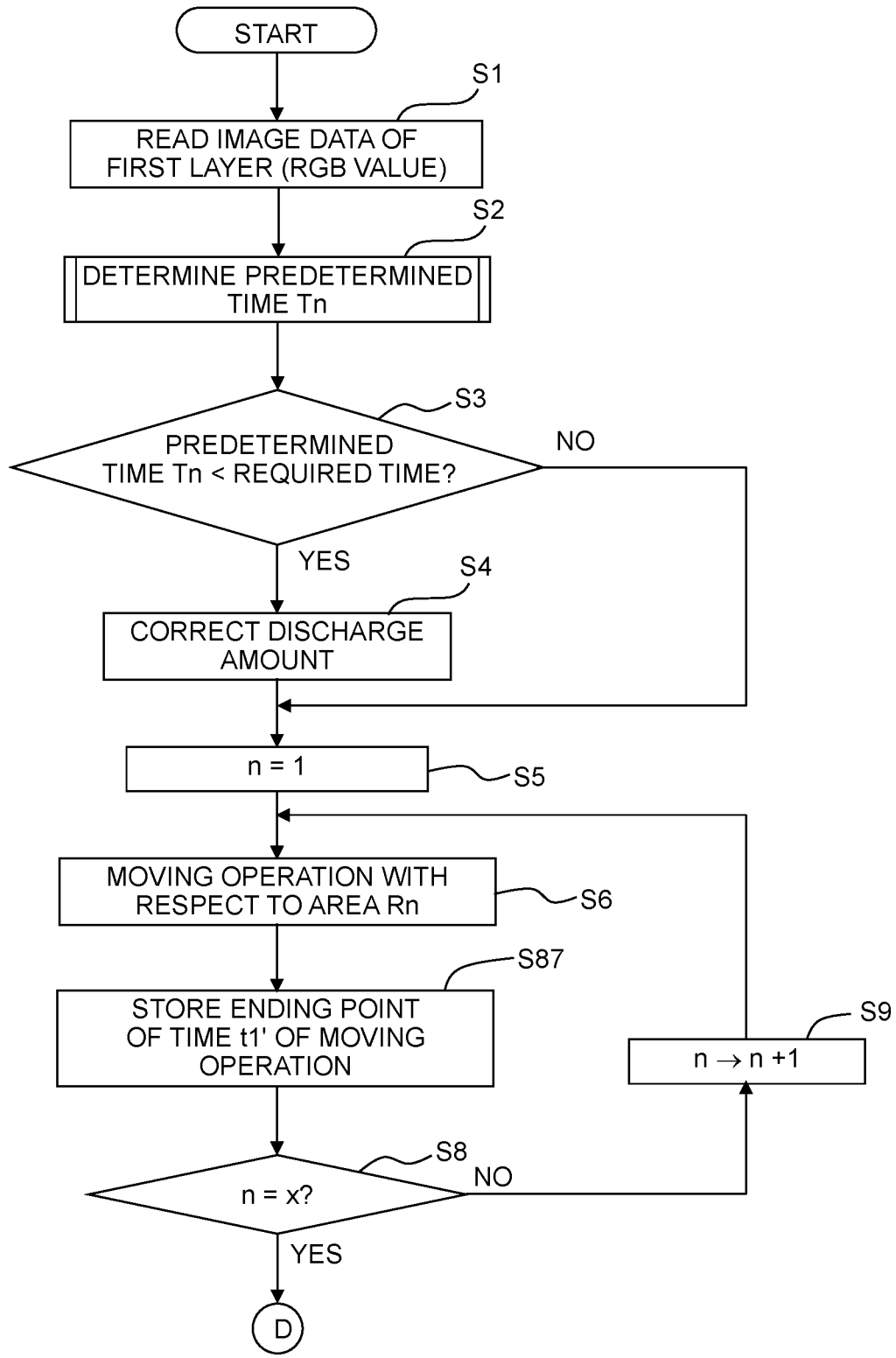
FIGS. 14A and 14B are a flow chart indicating a program executed by the CPU in a fifth embodiment of the present disclosure.
Figure 14B:
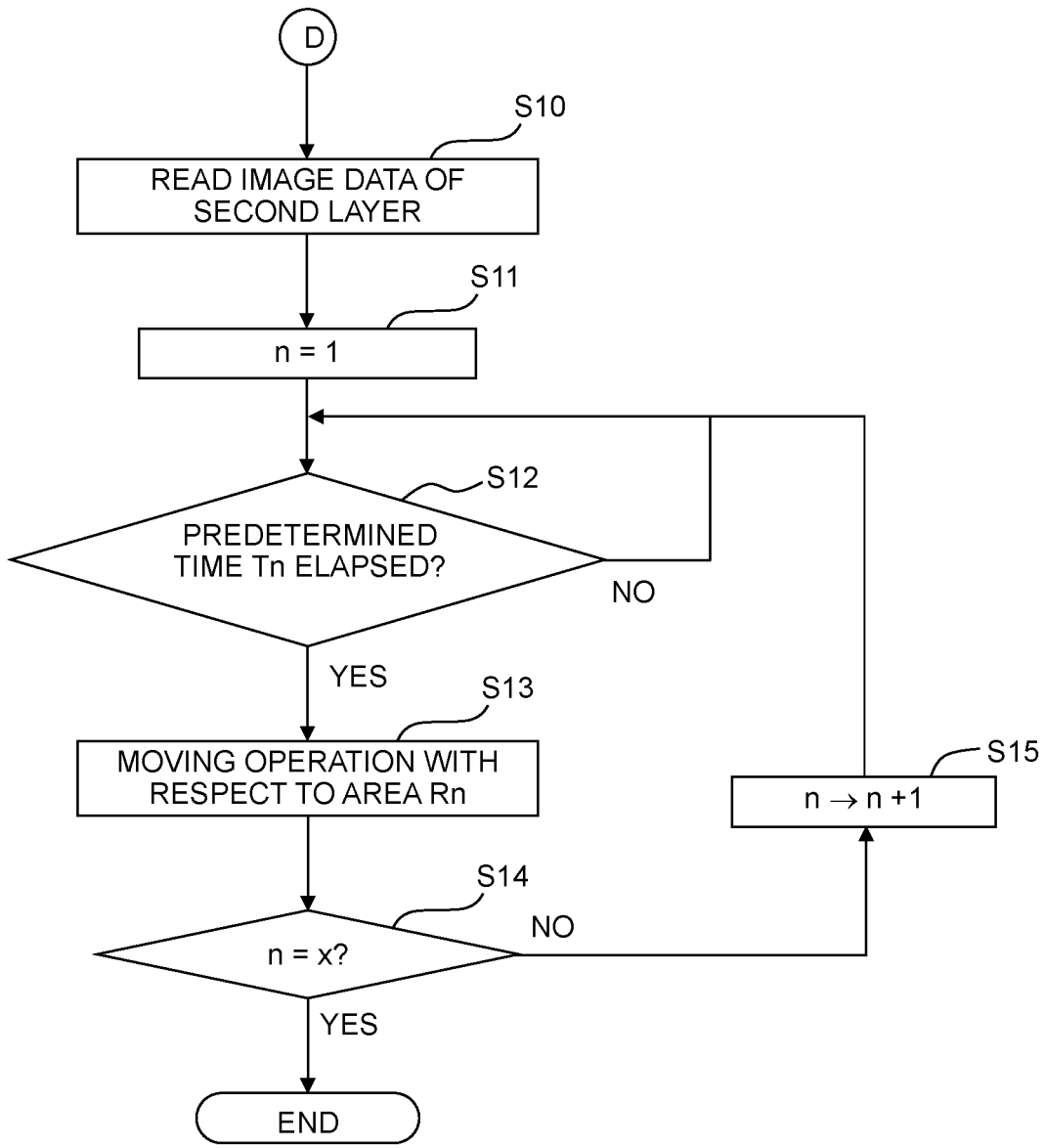

A program indicated in FIGS. 14A and 14B is similar to the program of FIGS. 4A and 4B, except that step S7 is replaced with step S87. In step S87, the CPU 91 causes the RAM 93 to store a point of time obtained from the timer 61 (see FIG. 3) at a point of time of the end of step S6 (the first recording processing), as a "ending point of time t1' of the first moving operation". Step S87 corresponds to a "storing processing" of the present disclosure. The ending point of time t1' corresponds to a "first recording processing ending-point of time". In step S12, the CPU 91 determines whether or not the point of time obtained from the timer 61 (see FIG. 3) has reached a point of time obtained by adding the predetermined time Tn determined in step S2 to the ending point of time t1' stored in step S87. Then, in a case that the CPU 91 determines that the point of time obtained from the timer 61 (see FIG. 3) has reached the point of time obtained by adding the predetermined time Tn determined in step S2 to the ending point of time t1' stored in step S87 (step S12: YES), the CPU 91 executes step S13 (the second recording processing).

Although the fifth embodiment is different from the first embodiment in the point that the CPU 91 determines whether or not the predetermined time Tn has elapsed, with the "ending point of time t1'" as the reference, rather than the "starting point of time t1", the fifth embodiment has the other configuration similar to that of the first embodiment. Accordingly, it is possible to obtain the effect similar to that obtained by the first embodiment (namely, in a case of executing the recording processing continuously, it is possible to suppress the bleeding of the image and to shorten the processing time in a more ensured manner).

Modifications

Although the embodiments of the present disclosure have been explained in the foregoing, the present disclosure is not limited to or restricted by the above-described embodiments, and various design changes can be made within the scope of the claims.

The CPU 91 determines whether or not the predetermined time has elapsed, with the "starting point of time" of the first recording processing as the reference in the first embodiment, and with the "ending point of time" of the first recording processing as the reference in the fifth embodiment. The present disclosure, however, is not limited to this; the CPU 91 may determine whether or not the predetermined time has elapsed, with any point of time in the first recording processing as the reference.

In the above-described embodiment, the CPU 91 obtains the weight values for each of the plurality of pieces of the unit data S (the relevant information relevant to the predetermined time), each of the plurality of pieces of the unit data corresponding to one of the plurality of unit areas S including the plurality of pixels (see FIG. 6), and determines the predetermined time based on this. The present disclosure, however, is not limited to this. For example, it is allowable that one pixel is made to be a unit data, and that the CPU 91 determines the predetermined time based on any one of the weight values of the plurality of pixels (each of which is the unit data) included in the first image data or based on the average value of the weight values.

In the third and fourth embodiments, the CMYK value is exemplified as the data corresponding to the color of the liquid to be discharged from the nozzles. The present disclosure, however, is not limited to this. For example, it is allowable that the data corresponding to the color of the liquid to be discharged from the nozzles may be exemplified by a CMYKW (Cyan, Magenta, Yellow, Black and White) value.

In the above-described embodiments, although the two times of the moving operation are executed with respect to each of the areas R1 to Rx, it is allowable to execute not less than three times of the moving operation with respect to each of the areas R1 to Rx. In this case also, it is possible to suppress the bleeding of the image, by providing the predetermined time every time the moving operation is executed with respect to each of the areas R1 to Rx.

The first image data and the second image data may be same as each other, or may be different from each other. For example, in order to achieve a satisfactory color development, it is allowable to perform, with respect to the first area and the second area which overlap with each other, the recordings which are based on the first image data and the second image data which are same as each other. Alternatively, it is allowable to perform, with respect to the first area and the second area which overlap with each other, recording of a underlayer with the white color based on the first image data, and then to perform recording of a color image or a black image based on the second image data.

As long as the second area is an area which overlaps with or is adjacent to the first area, the second area is not limited to or restricted by being the same area as the first area (namely, an area entirely overlapping with the first area). For example, the second area may be an area partially overlapping with the first area, or may be an area adjacent to the first area in the conveying direction or the moving direction.

Although the head in the above-described embodiment is of the serial system, the head may be of the line system.

The liquid discharged from the nozzles is not limited to the ink, and may be a liquid which is different from the ink (e.g., a treatment liquid which agglutinates or precipitates a component of ink, etc.).

The recording medium is not limited to the paper sheet (paper), and may be a cloth, a resin member, etc.

The present disclosure is also applicable to facsimiles, copy machines, multifunction peripherals, etc. without being limited to printers. The present disclosure is also applicable to a liquid discharging apparatus used for any other application than the image recording (e.g., a liquid discharging apparatus which forms an electroconductive pattern by discharging an electroconductive liquid on a substrate).

The program according to the present disclosure is distributable by being recorded or stored on a removable-type recording medium such as a flexible disk, etc., and on a fixed-type recording medium such as a hard disk, etc., and is also distributable via a telecommunication line.

What is claimed is:

1. A liquid discharging apparatus comprising:
a head having a plurality of nozzles; and
a controller,
wherein the controller is configured to execute:
a first recording processing of discharging liquid from the nozzles with respect to a first area of a recording medium based on first image data; and
a second recording processing of discharging the liquid from the nozzles with respect to a second area, of the recording medium, which overlaps with or is adjacent to the first area based on second image data, after a predetermined time has elapsed since the first recording processing, and
wherein the controller is configured to further execute a determining processing of determining the predetermined time based on color information of the first image data.

2. The liquid discharging apparatus according to claim 1, wherein the controller is configured to:
obtain each of weight values relevant to the predetermined time from one of a plurality pieces of unit data constructing the first image data, each of the plurality pieces of unit data corresponding to one of a plurality of unit areas constructing the first area; and
determine the predetermined time based on any one of the weight values, or based on an average value of the weight values.

3. The liquid discharging apparatus according to claim 2, wherein the controller is configured to determine the predetermined time based on the maximum weight value which is included in the weight values.

4. The liquid discharging apparatus according to claim 1, wherein in a case that the controller executes a plurality of sets of the first recording processing and the second recording processing, the controller is configured to determine the predetermined time in the determining processing such that the predetermined time becomes same between the plurality of sets of the first recording processing and the second recording processing.

5. The liquid discharging apparatus according to claim 4, further comprising:
a moving mechanism configured to move the head in a moving direction; and
a conveyor configured to convey the recording medium in a conveying direction intersecting with the moving direction,
wherein the first image data includes:
first divided image data for discharging the liquid from the nozzles with respect to the first area while causing the moving mechanism to move the head in the moving direction in a case that the recording medium conveyed by the conveyor is positioned at a first position; and
second divided image data for discharging the liquid from the nozzles with respect to another first area, of the recording medium, while causing the moving mechanism to move the head in the moving direction in a case that the recording medium conveyed by the conveyor is positioned at a second position which is different from the first position,
wherein the second image data includes:
third divided image data for discharging the liquid from the nozzles with respect to the second area while causing the moving mechanism to move the head in the moving direction, and
fourth divided image data for discharging the liquid from the nozzles with respect to another second area, of the recording medium, which overlaps with or is adjacent to the another first area, while causing the moving mechanism to move the head in the moving direction,
wherein the predetermined time includes a first predetermined time and a second predetermined time, the first predetermined time being a time period between the first recording processing based on the first divided image data and the second recording processing based on the third divided image data, the second predetermined time being a time period between the first recording processing based on the second divided image data and the second recording processing based on the fourth divided image data, and
wherein in the determining processing, the controller is configured to determine the predetermined time such that the first predetermined time and the second predetermined time are made to be mutually same.

6. The liquid discharging apparatus according to claim 4, wherein after the determining processing, the controller is configured to further execute a discharge amount correcting processing of correcting the first image data such that an amount of the liquid to be discharged from the nozzles in the first recording processing is decreased.

7. The liquid discharging apparatus according to claim 1, wherein the color information is a RGB value corresponding to a color of an image.

8. The liquid discharging apparatus according to claim 1, wherein the color information is data corresponding to a color of the liquid to be discharged from the nozzles.

9. The liquid discharging apparatus according to claim 8, wherein the controller is configured to further execute a converting processing of converting a RGB value corresponding to a color of an image to be recorded on the first area to data corresponding to a color of the liquid to be discharged from the nozzles, and
wherein in the determining processing, the controller is configured to determine the predetermined time based on the data converted in the converting processing and corresponding to the color of the liquid.

10. The liquid discharging apparatus according to claim 8, wherein the controller is configured to further execute a receiving processing of receiving data from an external apparatus, the data obtained by converting a RGB value corresponding to a color of an image to be recorded on the first area, and corresponding to a color of the liquid to be discharged from the nozzles, and
wherein in the determining processing, the controller is configured to determine the predetermined time based on the data received in the receiving processing and corresponding to the color of the liquid.

11. The liquid discharging apparatus according to claim 1, further comprising:
a timer; and
a memory, wherein the controller is further configured to:
  store a point of time in the memory as a first recording processing-starting point of time, the point of time obtained from the timer at a time of starting the first recording processing; and
  determine whether the point of time obtained from the timer has reached a point of time obtained by adding the predetermined time to the first recording processing-starting point of time, and
wherein in a case that the controller determines that the point of time obtained from the timer has reached the point of time obtained by adding the predetermined time to the first recording processing-starting point of time, the controller is configured to start the second recording processing.

12. The liquid discharging apparatus according to claim 1, further comprising:
a timer; and
a memory,
wherein the controller is further configured to:
  store a point of time in the memory as a first recording processing ending-point of time, the point of time obtained from the timer at a time of ending the first recording processing; and
  determine whether the point of time obtained from the timer has reached a point of time obtained by adding the predetermined time to the first recording processing ending-point of time, and
wherein in a case that the controller determines that the point of time obtained from the timer has reached the point of time obtained by adding the predetermined time to the first recording processing ending-point of time, the controller is configured to start the second recording processing.

13. The liquid discharging apparatus according to claim 1, further comprising a conveyor configured to convey the recording medium in a conveying direction,
wherein the first area and the second area each extend in an orthogonal direction orthogonal to the conveying direction, and overlap with each other.

14. A controlling method for controlling a liquid discharging apparatus including a head having a plurality of nozzles, the controlling method comprising:
  a first recording processing of discharging liquid from the nozzles with respect to a first area of a recording medium based on first image data; and
  a second recording processing of discharging the liquid from the nozzles with respect to a second area, of the recording medium, which overlaps with or is adjacent to the first area based on second image data, after a predetermined time has elapsed since the first recording processing,
wherein the controlling method further comprising a determining processing of determining the predetermined time based on color information of the first image data.

15. A non-transitory medium storing a program for controlling a liquid discharging apparatus including a head having a plurality of nozzles, and a controller, the program, when executed by the controller, causing the liquid discharging apparatus to execute:
  a first recording processing of discharging liquid from the nozzles with respect to a first area of a recording medium based on first image data; and
  a second recording processing of discharging the liquid from the nozzles with respect to a second area, of the recording medium, which overlaps with or is adjacent to the first area based on second image data, after a predetermined time has elapsed since the first recording processing,
wherein the program causes the liquid discharging apparatus to further execute a determining processing of determining the predetermined time based on color information of the first image data.

* * * * *